United States Patent [19]
Andersen

[11] 3,763,570

[45] Oct. 9, 1973

[54] APPARATUS FOR ADJUSTING THE RELATIVE INCLINATION OF TWO MEMBERS

[76] Inventor: Harold A. Andersen, 627 Monroe St., Gretna, La. 70053

[22] Filed: Mar. 23, 1971

[21] Appl. No.: 127,329

[52] U.S. Cl.......................... 33/370, 33/185, 33/333
[51] Int. Cl.......................................... B27g 23/00
[58] Field of Search.............. 33/185, 181 R, 180 R, 33/212 R, 212 A, 207, 69

[56] References Cited
UNITED STATES PATENTS

| | | | |
|---|---|---|---|
| 2,374,124 | 4/1945 | Peer | 33/69 X |
| 1,893,988 | 1/1933 | French | 33/212 A |
| 2,782,524 | 2/1957 | Vogt | 33/212 A |
| 2,627,665 | 2/1953 | Strnad | 33/207 R |
| 3,034,220 | 5/1962 | Fell | 33/212 R |
| 3,026,625 | 3/1962 | Carey | 33/212 R |

FOREIGN PATENTS OR APPLICATIONS

| | | | |
|---|---|---|---|
| 864,575 | 4/1961 | Great Britain | 33/207 |

Primary Examiner—William D. Martin, Jr.
Attorney—Cushman, Darby & Cushman

[57] ABSTRACT

A method is provided for adjusting orientation of the head of a machine tool with respect to the worktable thereof. A first bullseye level, mounted on an adjustable platform, is leveled upon a known surface by using the platform adjustments and then placed upon the worktable. Next a second bullseye level which is suspended from a shaft on a platform perpendicular thereto is grasped by the chuck of the machine tool head by means of the shaft. The adjustable machine tool head is then adjusted to that second bullseye level indicates a reading identical to the first bullseye level. Thus, the head and the work table of the machine are rapidly brought into a perfectly perpendicular alignment.

1 Claim, 6 Drawing Figures

PATENTED OCT 9 1973

INVENTOR
HAROLD A. ANDERSEN
BY Cushman, Darby & Cushman
ATTORNEYS

INVENTOR
HAROLD A. ANDERSEN

APPARATUS FOR ADJUSTING THE RELATIVE INCLINATION OF TWO MEMBERS

BACKGROUND OF THE INVENTION

1. Field of the Invention

This invention relates to machine tools having adjustable heads, and more specifically, apparatus or methods for adjusting the inclination of the adjustable heads with respect to the worktable.

2. Description of the Prior Art

Machine tools having adjustable heads and fixed worktables which rest upon the floor of machine shops are well known. By the use of various attachments such machine tools can be used for vertical and horizontal milling, drilling, boring, straddle and cam milling, drilling, profiling, reaming, slotting, and other maching operations. Typically, such adjustable heads may be rotated about their transverse as well as their longitudinal axes to provide two degrees of freedom for aligning the head with respect to the worktable.

In certain machining operations, it is necessary to have the head perfectly square, i.e., perpendicular with respect to the worktable. Furthermore, this problem is aggravated when the spindle has been rotated about its transverse or longitudinal axes to provide machining at a given angle and then it is desired to return the head to a perfect square with respect to the table.

Known machine tools utilize graduations on the head to indicate the degree of tilt of their heads in both the transverse and longitudinal axis. However, these graduations, while close enough for normal milling, are not close enough for precise boring and similar work. The prior art has attempted to solve this problem by the provision of an indicator which comprises a pair displacement indicating devices. These devices each indicate the displacement of point which depend therefrom. The displacement indicating devices are attached to a horizontally disposed arm from which a vertically disposed shaft extends upward parallel to the points. The vertically disposed shaft is, in turn, inserted within the head of the machine and grasped in the chuck and the points of the indicating devices are placed on the worktable along the transverse axis of the head. The head is then adjusted so that each of the displacement indicating devices indicates an equal amount. At this time the chuck is loosened and the displacement indicating devices ae then rotated about their axis so that they follow the longitudinal axis of the spindle. This method has a disadvantage that it must be repeated in both the transverse and longitudinal axis of the head. In addition, the apparatus used in this method is a hypersensitive and rather expensive instrument.

A much simpler leveling device is known to the prior art; namely, the bullseye level. In the bullseye level a single air bubble is trapped with inner fluid beneath a semispherical surface of a transparent material. Longitudinal and latitudinal lines are formed upon the surface to indicate the tilt of the level in any direction. Obviously it would be useful to replace the complex and expensive device used in the prior art with a bullseye type of level device, however, the prior art only used such a bullseye level to level a single member.

SUMMARY OF THE INVENTION

In view of the disadvantages discussed above, it is the object of the applicant's invention to provide a method for leveling the head of a machine tool with respect to a table thereof which utilizes relatively inexpensive instrumentation. Further, it is another object of the applicant's invention to provide a method for relatively inclining the head and worktable of a machine tool which requires a small number of steps and thus a small amount of time.

In applicant's invention, a bullseye type level is placed upon a level plane and is adjusted with respect thereto to provide a zero reading. This level is then placed upon a worktable. A second bullseye level is mounted upon a platform which depends from a shaft which is perfectly perpendicular with the platform. The shaft is inserted within the chuck portion of the machine tool and the machine tool head is then adjusted in each of its degrees of freedom, i.e., along its transverse and its longitudinal axes, to produce a reading upon the second bullseye equal to the reading of the first bullseye level. The machine tool head and the table then perfectly perpendicular or, in other words, the head is perfectly square with the table. As should be apparent, the applicant's invention is applicable to situations other than described above and, in fact, is applicable to any situation wherein it is desired to relatively incline a first and second member which are relatively movable with respect to one another.

BRIEF DESCRIPTION OF THE DRAWINGS

The same reference numerals indicate the same elements throughout.

DETAILED DESCRIPTION OF THE PREFERRED EMBODIMENT

Figure 1:
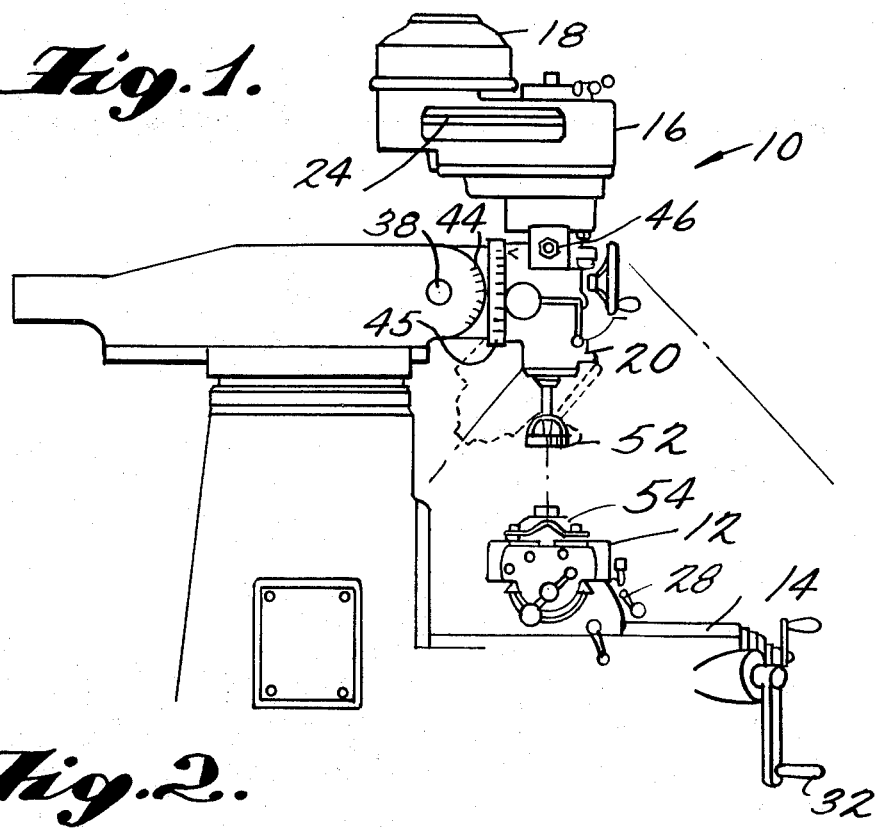
FIG. 1 is a side view of a conventional machine tool.

In FIG. 1 a conventional machine tool is indicated generally by reference numeral 10. The machine tool comprises in part a worktable 12, which is supported on the base 14, parallel thereto. The machine also includes a turret head 16 upon which is mounted a motor 18 and a spindle 20 which includes a chuck 22 (not shown) for grasping a variety of milling, drilling, boring, reaming, and other tools. The various tools are driven by motor 18 through the variable belt transmission 23 of which only belt 24 is shown.

The worktable 12 may be adjusted vertically by crank 28 or left and right with respect to the machine by crank 30 and toward or away from the machine by crank 32. In addition, the spindle 20 may be moved toward and away from the worktable by means of quickly adjusting handle 34 or hand feed wheel 36.

More important to the present invention is the fact that the turret head may be rotated about pivot point 38 to, for example, the position shown in FIG. 1 in dashed lines, by adjusting the vertical adjusting worm shaft 40 which is connected to a vertically adjusted worm gear 42 (not shown) which engages the head. Scale 44 shows roughly the degree of pivot of point 38. In addition, the turret head 16 may be rotated about the ring 45 to, for example, the positions shown in dashed lines in FIG. 2, by the means of the adjusting worm shaft 46 which is, in turn, connected to a worm 48 (not shown). The angle of the turret head with respect to a line perpendicular to the worktable is then indicated by a scale printed upon a ring and the pointer on the head.

Figure 2:
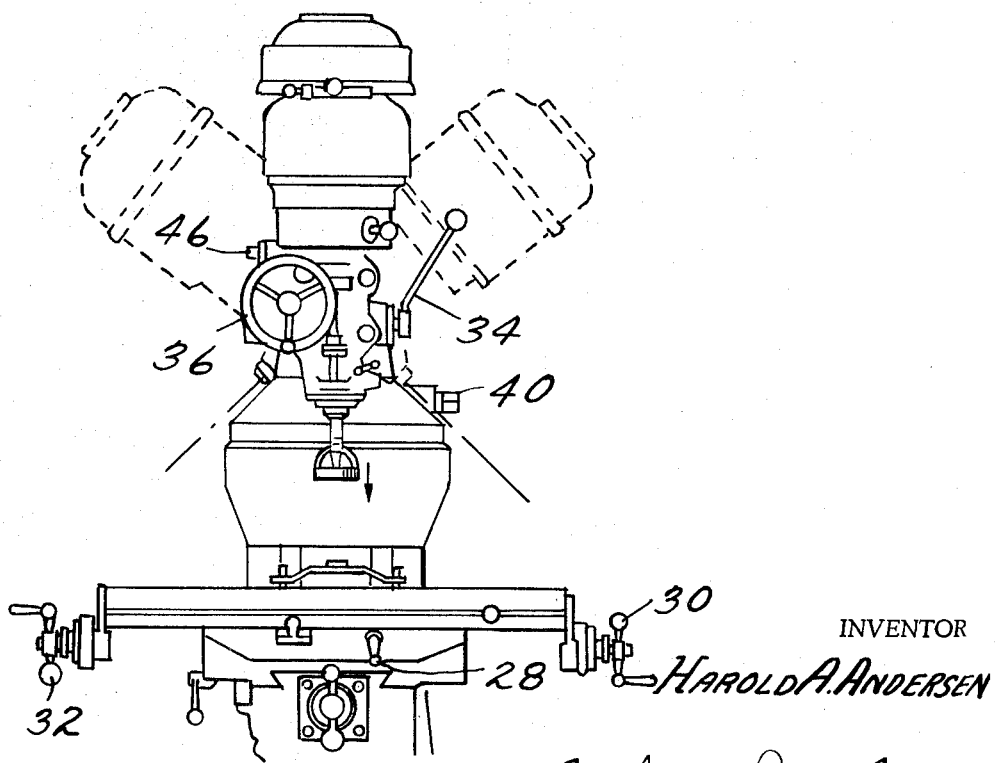
FIG. 2 is a front view of the machine tool shown in FIG. 1.

FIGS. 1 and 2 indicate in solid lines the normal perpendicular position off the head with respect to the table and dashed lines indicate examples of the angularly displaced head positions which are possible with the doubly pivotable turret head 16 turret head 16.

Also shown in FIG. 1 is the apparatus employed in the present invention for orienting the head with respect to the table. Reference numeral 52 refers to a bullseye level mounted on a shaft which extends from the spindle 20 of the turret head 16 and is grasped in the chuck 24 thereof. Similarly, reference numeral 54 refers to bullseye level mounted on a separate adjustable platform which rests upon the worktable 12.

Figure 3:
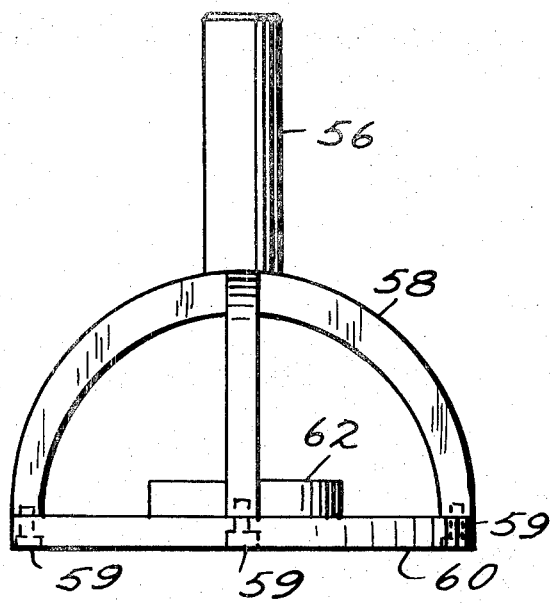
FIG. 3 is a side view of the shaft mounted level indicating means used in the invention.
Figure 4:
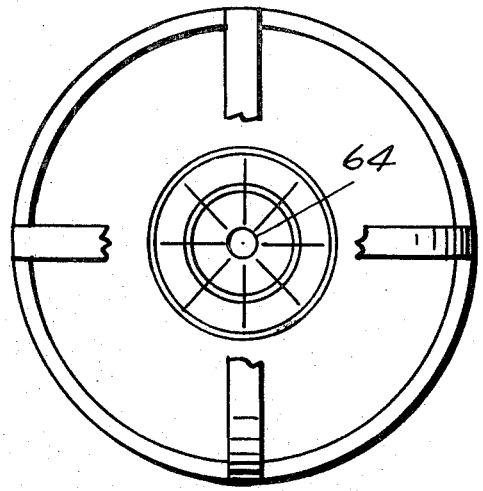
FIG. 4 is a top view of the shaft mounted level indicating means of FIG. 3.

Referring to FIGS. 3 and 4, the shaft mounted bullseye level 52 will now be discussed in greater detail. Reference numeral 56 refers to a shaft which is properly sized for reception in and grasping by chuck 24 of a standard machine tool. For instance, the shaft may be a cylinder ¾ of inch in diameter. Depending from the shaft and affixed thereto are four arc shaped arms 58 which support the circular platform 60 in a manner perfectly perpendicular to the center line of the shaft 56. The platform is connected to the arms 58 by bolts 59 the threads of which are received within countersunk portions of platforms 60. The arms 58 and the platform 60, as well as the shaft 56, are made of substantially rigid material to avoid distortion and to provide a rigid support for the bullseye level 62. As is best seen in FIG. 3, the bullseye level 62 comprises a series of concentric circles, having as their common axis the center line of the platform 60, as well as a plurality of radial lines which meet at the axis of the two concentric circles. As is well known as with respect to bullseye levels the single bubble 64 is entrapped within a liquid which is, in turn, encased within the bullseye level. The position of the bubble 64 then with respect to concentric rings and radial lines indicates the position of the bullseye level with respect to a horizontal plane. Since the platform 60 and the bullseye level 62 are perfectly perpendicular to shaft 56 the position of the bubble 64 also indicates whether the shaft 56 is perpendicular to the horizontal plane.

Figure 5:
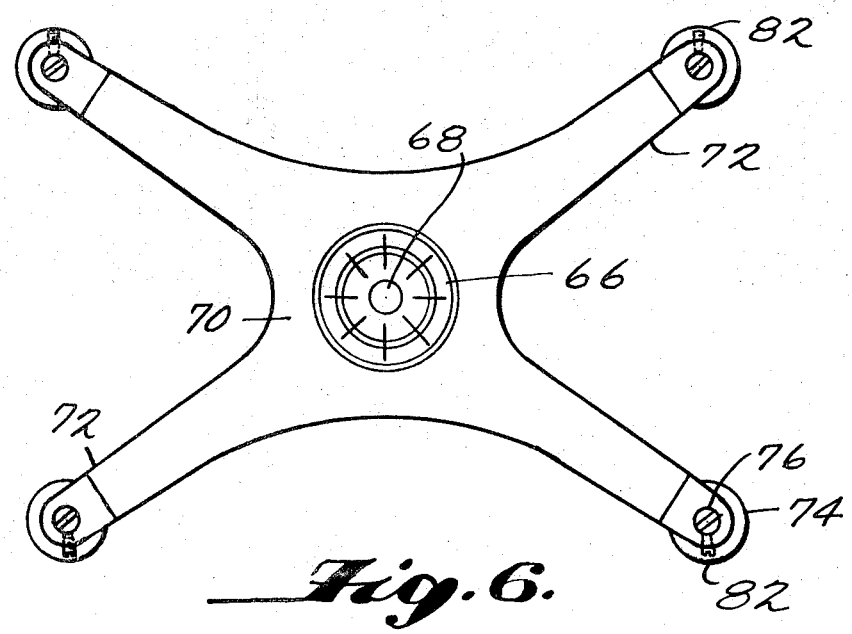
FIG. 5 is a top view of the table mounted indicating means in the invention.
Figure 6:
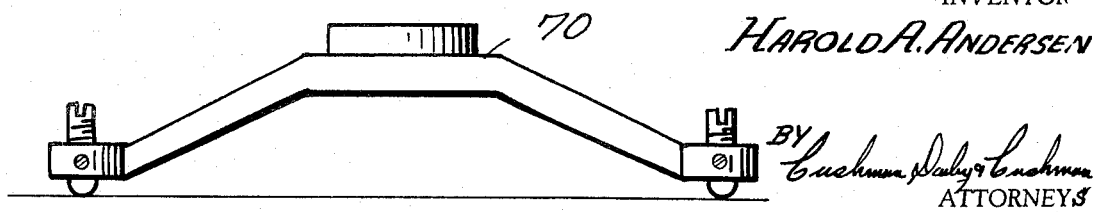
FIG. 6 is a side view of the table mounted indicating means of FIG. 5.

Turning now to FIGS. 5 and 6 it is seen that a bullseye level 66 is provided therein which is identical in all respects to the level 62 and this level includes a bubble 68 which corresponds to the bubble 64 of bullseye level 62. The bullseye level 66 is supported upon a platform 70 which is, in turn, supported by the legs 72 as is apparent in FIG. 7. The feet 74 of the legs 72 contain threaded screws 76 which are located at threaded holes 78 within the feet. The level 66 may be adjusted by placing the screw 76 upon a surface 80 which is known to be level and adjusting the screws 76 until the bubble 68 is directly in the center of the bullseye level 66. At this time, the set screws 82 which extend into the feed 74 are tightened into contact with the screws 76 to lock the screws 76 into the correct position.

When it is desired to level the head 16 with respect to the worktable 12 the platform 70 is placed upon the worktable 12. Since the bullseye level 66 indicates an inclination of the worktable 12 in any direction, the inclination of the screws 76 on the table 12, are not important so long as the screws rest upon level surface of the table. If the machine tool 10 is placed upon a perfectly level surface and if base 14 is perfectly parallel to the worktable 12 then the bubble 68 should be perfectly centered within the bullseye level 66 since, as has been described above, this is the position that bubble 68 occupies to indicate an inclination parallel to the horizontal plane. If, however, as is the case perhaps 70 percent of machine tool environments, the worktable 12 is not parallel to the horizontal plane, bubble 68 will indicate the degree and direction of inclination. To perfectly align the head 16 with respect to the table 12 all that must then be done is to insert the shaft 56 into the chuck 24 of the drill 22 and to tighten the chuck to grasp the shaft. The turret head 16 is then adjusted by the adjusting worm shafts 40 and 46 described above until the bubble 64 is given an inclination identical to bubble 68. It is thus seen that a convenient and practically foolproof apparatus and method is provided for aligning the head of a machine tool with respect to its worktable which, furthermore, requires no complicated indicators but merely relatively inexpensive bullseye levels.

While the above description fully cover the preferred embodiment of the applicant's invention, it should be apparent to one skilled in the art that many modifications may be made within the scope of the applicant's invention. Obviously, particular shape means for supporting bullseye level 62 and 66 may vary markedly from that described above.

More importantly, while the above description has been confined to machine tools, the method described above and the apparatus utilized in carrying out that method may be used to align any two members. Further, while bullseye levels have been shown above, these levels could be fully replaced by cylindrical levels arranged in right angular relations to give readings in perpendicular directions or cylindrical levels alone could be used if the first member has but one degree of freedom with respect to the second member.

Finally, the various means may be employed to fix the bullseye levels to their respective platforms.

What is claimed is:

1. In an apparatus including a turret head having a spindle, said spindle having grasping means, said turret head being mounted for movement about a plurality of axes, a work table located in spaced vertical relationship with said spindle on said turret head, said apparatus having means for precisely adjusting the relative inclination between said spindle and turret head and said work table, the improvement comprising a first level indicating means including a platform having an upper surface and a lower surface a plurality of arms extending from said upper surface and converging substantially above the center of said platform, said arms being connected to a shaft, said shaft extending substantially perpendicularly with respect to said platform, said shaft being adapted to be grasped by said grasping means on said spindle, said platform including a bulls-eye level carried thereon so that when said shaft is grasped by said grasping means on said spindle, the inclination of said turret head and said worktable with respect to a reference plane will be indicated, a second level indicating means including a platform having a plurality of support legs extending therefrom, said support legs having contact ends all of which are adjustable to lie in the same plane, said platform of said second indicating means having a bullseye level located at its center so that, when said second indicating means is placed on said work table, the relative inclination between said turret head and said spindle may be determined by comparing the indications of said first and second level indicating means.

* * * * *